United States Patent Office 3,579,574
Patented May 18, 1971

3,579,574
PRODUCTION OF ACRYLIC ACID
Wilhelmus Teunis van der Meer, London, England, assignor to The Distillers Company Limited, Edinburgh, Scotland
No Drawing. Filed Jan. 22, 1965, Ser. No. 427,502
Claims priority, application Great Britain, Feb. 5, 1964, 4,804/64
Int. Cl. C07c 51/26, 51/32
U.S. Cl. 260—530                                    11 Claims

ABSTRACT OF THE DISCLOSURE

Acrylic acid is prepared by the vapor phase oxidation of propylene or acrolein with oxygen in the presence of a catalyst consisting essentially of an oxide composition containing antimony and vanadium or antimony, vanadium and at least one polyvalent metal selected from the group of iron, manganese, chromium, cobalt, nickel, copper, zinc, cadmium, tungsten and thorium, the catalyst being heated to a temperature above 700° to about 900° C. in molecular oxygen gas before use.

---

The present invention relates to a process for the production of unsaturated aliphatic acids and in particular to a process for the production of acrylic acid.

Accordingly the present invention is a process for the production of acrylic acid which comprises the oxidation of acrolein or a compound giving rise to acrolein under the reaction conditions with molecular oxygen at an elevated temperature in the vapour phase in the presence as catalyst of an oxide composition containing antimony and vanadium which has been heated before use to a temperature within the range 550° to 1000° C. in a molecular oxygen-containing gas.

Propylene may be employed as the compound giving rise to acrolein under the reaction conditions. It is preferred to use propylene as the starting material in which case the reaction products will contain acrolein in addition to acrylic acid.

The oxide composition catalysts of the present invention contain antimony and vanadium and may contain one or more additional polyvalent materals, for example, tin, titanium, chromium, manganese, iron, cobalt, nickel, copper, zinc, cadmium, tungsten or thorium. Preferred catalysts contain antimony, vanadium, iron and tin or antimony, vanadium, copper and tin.

The oxide composition catalysts may be regarded either as mixtures of metal oxides or as oxygen-containing compounds of the metals; under the reaction conditions the catalyst may contain either or both forms.

The components of the catalyst may be mixed in any order, and the catalyst may be prepared in various ways. For instance, the antimony and vanadium together with the polyvalent metal or metals if this component is to be present in the final composition may be co-precipitated from a mixed aqueous solution of their soluble salts, for example the chlorides. In this case the precipitation may be carried out by the addition of ammonia. The precipitate is then thoroughly washed with water to remove soluble salts, for example, ammonium chloride.

Alternatively an antimony/vanadium oxide composition may be prepared and the polyvalent metal or metals, if this component is to be added, subsequently incorporated. The antimony/vanadium oxide composition may be prepared by co-precipitation as before or by intimately mixing one or more oxides of antimony such as trioxide, tetroxide, pentoxide or a hydrated oxide with one or more oxides of vanadium. Mixtures of the oxides or hydrated oxides, for example, those formed by the action of aqueous nitric acid on antimony and vanadium metals or on mixtures of metals may also be used. In this case the mixed oxide composition contains residual nitrate ion and this may be removed by washing either with hot water or with a dilute solution of ammonia or an organic base. Polyvalent metal or metals may then be added to the mixture, for example, as an insoluble neutral compound which is convertible to oxide on heating. Examples of such insoluble neutral compounds are the hydroxides, carbonates and hydrated oxides.

Alternatively the polyvalent metal or metals may be added to the antimony/vanadium composition in the form of a soluble salt or salts such as a nitrate, formate, acetate, chloride or sulphate, the oxides then being precipitated by the addition of a base such as ammonia. A preferred method of preparing the catalyst comprises mixing finely divided vanadium pentoxide with a slurry or suspension in water of the other oxides or hydrated oxides.

The proportions of the various components of the oxide composition catalyst may vary within moderately wide limits. Suitably the composition contains an excess of antimony over any other single component and preferably an atomic ratio of antimony and vanadium within the range 1.8:1 to 4:1; or more especially between 2.5:1 and 3.5:1. When a polyvalent metal is present in the composition it is preferred to have an atomic ratio of vanadium to polyvalent metal within the range 1:0.25 to 1:2.

By whichever method the oxide composition is prepared it is subjected to a prior heat treatment at a temperature within the range 550° to 1000° C. preferably 700 to 900° C., and more especially between 750 and 850° C., in a molecular oxygen containing gas, e.g. air. The time of heating is not critical and may be, for example, from about 4 hours to about 40 hours. The rate of heating may be varied within wide limits. Thus for example the catalyst may be heated to 150° C., and then at an average rate of 50°/hour preferably between 10 and 25°/hour until the desired upper limit of temperature is reached. The supply of molecular oxygen containing gas e.g. air at this time is preferably adjusted to leave a concentration of oxygen in excess of 5% in the gases leaving the heating furance. It has been found that the prior heat treatment of the oxide composition is essential in order for it to be of value as a catalyst in the commercial scale process.

The oxide composition catalysts may, if desired, be deposited upon supports such as alumina, pumice, silica or titania.

The reaction of propylene or acrolein with molecular oxygen over the oxide composition catalysts may be carried out in any suitable manner, for instance, as a fixed bed process in which the catalyst is used in the form of granules or pellets, or as a fluidized bed process, or as a moving bed process.

The proportion of propylene or acrolein in the feed to the reaction may vary within fairly wide limits, for example between 1 and 20% by volume of the feed, and suitably between 2 and 10% by volume.

The concentration of oxygen in the feed may also vary within moderately wide limits, for example between 1 and 20% by volume and preferably between 2 and 15% by volume. The oxygen may be diluted with inert gases, and may be, for example, supplied as air.

It is preferred to carry out the reaction in the presence of a gas which is substantially inert under the conditions of reaction, for example, nitrogen, propane, butane, isobutane, carbon dioxide and/or steam. It is preferred to use steam or nitrogen or mixtures thereof. The concentration of the steam may vary within wide limits, for example, between 10 and 60% by volume of the feed.

The reaction is carried out at an elevated temperature, for instance between 250° and 550° C., and preferably between 300 and 500° C. The reaction may also be carried out under pressure for example pressures of from 0.5 to 5 atmospheres absolute.

The contact time may be, for example, in the range ½ to 30 seconds and preferably between 1 and 5 seconds.

The acrylic acid may be recovered from the reaction product by any conventional method, for example, by condensation or extraction with water.

The process of the invention is further illustrated by the following examples.

EXAMPLE 1

Antimony trioxide (145 parts by weight) was added to a rapidly-stirred mixture of concentrated nitric acid (S.G. 1.42, 210 parts by weight) and water (600 parts by weight) at 98–100°. After five minutes powdered tin (40 parts by weight) was added in small portions, and the resulting mixture was stirred at 100° for fifteen minutes, cooled to 40°, and filtered. The filter-cake was washed by resuspension and stirring for fifteen minutes in 1000 parts by weight of water at ambient temperature.

The washed filter-cake was suspended in a solution of ferric nitrate nonahydrate ($Fe(NO_3)_3 \cdot 9H_2O$: 135 parts by weight) in 1000 parts by weight of water. Aqueous ammonia (one part by volume of aqueous ammonia, S.G. 0.88, to two parts by volume of water) was added dropwise with rapid stirring at 50° C. and filtered: the filter-cake was washed twice by resuspension and stirring for fifteen minutes in 1000 parts by weight of water at ambient temperature.

The washed filter-cake was suspended and stirred rapidly in 1000 parts by weight of water, and 38 parts by weight of vanadium pentoxide (previously passed through a 200 mesh (B.S.S.) sieve) was stirred in. The mixture was filtered and the filter-cake was dried at 130° for 24 hours, ground to pass 30 mesh (B.S.S.), mixed with 1% of its weight of graphite, and pelleted. The pellets were heated in a stream of air, the temperature of the furnace being raised from 200° to 800° at 22° per hour, and maintained at 800° for sixteen hours.

A mixture of, by volume acrolein (7%) oxygen (7%) nitrogen (56%) and steam (30%) was passed at a contact time of 4 seconds, calculated at N.T.P., over a bed of the catalyst maintained at 325° in a reactor. Of the acrolein fed to the reactor, 27% was converted to acrylic acid, 12% to carbon dioxide, 9% to carbon monoxide, and 42% was recovered.

EXAMPLE 2

60.6 parts by weight of vanadium pentoxide, 291.5 parts by weight of antimony trioxide and 350 parts by weight of distilled water were ball-milled together for two hours.

The resulting slurry was mixed with 133.4 parts by weight of chromium nitrate, $Cr(NO_3)_3 \cdot 9H_2O$ dissolved in 700 parts by weight of distilled water and aqueous ammonia, S.G. 0.88 added slowly with stirring until the pH was 6.5.

The suspension was filtered and the precipitate washed once by resuspension in 1000 parts by weight of distilled water. The moist filter-cake was dried at 110° C., sieved to less than 30 mesh (B.S.S.), mixed with 1% (by weight) of graphite and pelleted.

The catalyst was heated at 800° C. for 16 hours in a stream of air, the temperature of the furnace being raised from 200° C. to 800° C. at 22° C. per hour.

A gaseous mixture of, by volume propylene (10%), air (50%) and steam (40%) was passed at a contact time of 4 seconds through the catalyst maintained at 330° C. in a reactor.

Of the propylene fed, 13% was converted to acrylic acid, 26% to acrolein, 6% to carbon dioxide and 43% was recovered.

EXAMPLE 3

30.3 parts by weight of vanadium pentoxide were added to a mixture at 70–80° C. of 7.8 parts by weight of ethyl alcohol and 153.4 parts by weight of concentrated hydrochloric acid, S.G. 1.18. When the vanadium pentoxide had completely dissolved the solution was cooled to 20° C.

299 parts by weight of antimony pentachloride were dissolved in 59 parts by weight of concentrated hydrochloric acid S.G. 1.18.

66.7 parts by weight of chromium nitrate $$(Cr(NO_3)_3 9H_2O)$$

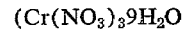

were dissolved in 59 parts by weight of concentrated hydrochloric acid, S.G. 1.18.

The three solutions were mixed with 484 parts by weight of aqueous ammonia, S.G. 0.88 were added dropwise with stirring. The suspension was diluted with 100 parts by weight of distilled water, and washed three times by resuspension in 1000 parts by weight of distilled water. The final moist filtercake was dried at 110° C., sieved to less than 30 mesh (B.S.S.), mixed with 1% (by weight) of graphite and pelleted.

The catalyst was heated at 800° C. for 16 hours in a stream of air, the temperature of the furnace being raised from 200° C. to 800° C. at 22° C. per hour.

A gaseous mixture of propylene (10% by volume), air (70% by volume) and steam (20% by volume) was passed at a contact time of 4 seconds through the catalyst maintained at 300° C. in a reactor.

Of the propylene fed, 13% was converted to acrylic acid, 22% to acrolein, 13% to carbon dioxide and 33% was recovered.

EXAMPLE 4

30.3 parts by weight of vanadium pentoxide were added to a mixture at 70–80° C. of 7.8 parts by weight of ethyl alcohol and 153.4 parts by weight of concentrated hydrochloric acid, S.G. 1.18. When the vanadium pentoxide had completely dissolved the solution was cooled to 20° C.

299 parts by weight of antimony pentachloride were dissolved in 59 parts by weight of concentrated hydrochloric acid, S.G. 1.18.

39.7 parts by weight of cobalt chloride, $CoCl_2 6H_2O$ were dissolved in 59 parts by weight of concentrated hydrochloric acid, S.G. 1.18.

The three solutions were mixed and 590 parts by weight of aqueous ammonia, S.G. 0.88 were added dropwise with stirring. The resulting suspension was filtered and the precipitate washed three times by resuspension in 1000 parts by weight of distilled water. The final moist filter-cake was dried at 110° C., sieved to less than 32 mesh (B.S.S.) mixed with 1% (by weight) of graphite and pelleted.

The catalyst was heated at 800° C. for 16 hours in a stream of air, the temperature of the furnace being raised from 200° C. to 800° C. to 22° C. per hour.

A gaseous mixture of propylene (5% by volume) air (55% by volume) and steam (40% by volume) was passed at a contact time of 4 seconds through the catalyst maintained at 390° C. in a reactor.

Of the propylene fed, 15% was converted to acrylic acid, 31% to acrolein 7% to carbon dioxide and 36% was recovered.

EXAMPLE 5

30.3 parts by weight of vanadium pentoxide were added to a mixture of 70–80° C. of 7.8 parts by weight of ethyl alcohol and 153.4 parts by weight of concentrated hydrochloric acid, S.G. 1.18. When the vanadium pentoxide had completely dissolved the solution was cooled to 20° C.

299 parts by weight of antimony pentachloride were dissolved in 59 parts by weight of concentrated hydrochloric acid S.G. 1.18.

39.6 parts by weight of nickel chloride, $NiCl_2 6H_2O$ were dissolved in 50 parts by weight of distilled water.

The three solutions were mixed and 440 parts by weight of aqueous ammonia, S.G. 0.88 were added dropwise with stirring. The suspension was filtered and the precipitate washed three times by resuspension in 1000 parts by weight of distilled water. The final moist filter-cake was dried at 110° C. sieved to less than 30 mesh (B.S.S.) mixed with 1% (by weight) of graphite and pelleted.

The catalyst was heated at 800° C. for 16 hours in a stream of air, the temperature of the furnace being raised from 200° C. to 800° C. at 22° C. per hour.

A gaseous mixture of proplyene (5% by volume) air (55% by volume) and steam (40% by volume) was passed at a contact time of 4 seconds through the catalyst maintained at 390° in a reactor.

Of the propylene fed, 15% was converted to acrylic acid, 31% to acrolein 7% to carbon dioxide and 32% was recovered.

EXAMPLE 6

30.3 parts by weight of vanadium pentoxide were added to a mixture at 70–80° C. of 15.8 parts by weight of ethyl alcohol and 348 parts by weight of concentrated hydrochloric acid, S.G. 1.18. When the vanadium pentoxide was completely dissolved the solution was cooled to 20° C. and added to a solution prepared by dropwise addition of 299.2 parts by weight of antimony pentachloride to 348 parts by weight of concentrated hydrochloric acid, S.G. 1.18.

To the resulting mixture was added a solution of 33.0 parts by weight of manganese dichloride tetrahydrate in 30 parts by weight of distilled water. The solution was stirred and diluted with 500 parts by weight of distilled water. Aqueous ammonia, S.G. 0.880 was added dropwise, at such a rate that the temperature of the solution did not exceed 70° C. until the pH of the solution was 7.0. The solution was cooled to 20° C. and filtered. The precipitate was washed three times by resuspension and stirring for 15 minutes in 1,000 parts by weight of distilled water, collected by filtration dried for 16 hours at 130° C. mixed with 1% of its weight of graphite, and pelleted. The pellets were heated in a stream of air, the temperature of the furnace being raised from 200° C. to 800° C. and 22° C. per hour and maintained at 800° C. for 16 hours.

A mixture of, by volume, 5% propylene, 45% steam and 50% air, was passed over a bed of the catalyst in a reactor at 417° C. The contact time, calculated at N.T.P. was 4 seconds.

Of the propylene fed to the reactor, 21% was converted to acrylic acid, 32% ac acrolein, 11% to carbon dioxide, and 29% was recovered.

30.3 parts by weight of vanadium pentoxide were added to a mixture of 70–80° C. of 15.8 parts by weight of ethyl alcohol and 354 parts by weight of concentrated hydrochloric acid, S.G. 1.18. When the vanadium pentoxide had completely dissolved the solution was cooled to 20° C.

299 parts by weight of antimony pentachloride were dissolved in 354 parts by weight of concentrated hydrochloric acid, S.G. 1.18.

27 parts by weight of ferric chloride were dissolved in 295 parts by weight of concentrated hydrochloric acid, S.G. 1.18.

The three dilutions were mixed, diluted with 500 parts by weight of distilled water and aqueous ammonia, S.G. 0.88, added with stirring until the pH was 7. The suspension was filtered and the precipitate washed twice by resuspension in 1,000 parts by weight of cold distilled water and finally by resuspension once in 1,000 parts by weight of distilled water at 80° C.

The moist filter-cake was dried at 130° C. sieved to less than 30 mesh (B.S.S.) mixed with 1% (by weight) of graphite and pelleted.

The catalyst was heated at 750° C. for 16 hours the temperature of the furnace being raised from 200° C. to 750° C. at 22° C. per hour.

A gaseous mixture of by volume propylene (5%) air (60%) and steam (35%) was passed at a contact time of 4 seconds through the catalyst maintained at 325° C. in a reactor.

Of the propylene fed, 31% was converted to acrylic acid, 30% to acrolein 14% carbon dioxide and 7% was recovered.

EXAMPLE 8

45 parts by weight of powdered tin were added over 30 minutes at 95–100° C. to a stirred mixture of 266 parts by weight of concentrated nitric acid, S.G. 1.42 and 750 parts by weight of distilled water.

91 parts by weight of powdered antimony were added over 30 minutes to 375 parts by weight of concentrated nitric acid, S.G. 1.42 at 95–100° C.

Each mixture was stirred for 10 minutes at 95–100° C. after completion of the addition, then that containing antimony was added to that containing tin, and the resulting mixture was stirred at 95–100° C. for a further 10 minutes, then cooled to 40° C. The supernatant liquor was removed and the precipitate washed by resuspension in 875 parts by weight of distilled water, and collected by filtration.

350 parts by weight of the moist filter-cake were resuspended in 750 parts by weight of distilled water and 120 parts by volume of a solution of vanadyl chloride added.

The vanadyl chloride solution was prepared by the careful addition of 30.3 parts by weight of vanadium pentoxide to a solution of 100 parts by weight of hydrochloric acid (35% w./w.) and 12 parts by volume of ethanol under reflux. The suspension was well stirred and precipitation of the vanadium was effected at room temperature by adjustment of the pH of the solution to ca. 6.5 by the addition of aqueous ammonia solution. The precipitate was filtered off and washed by resuspension with 750 parts by weight of distilled water. The catalyst was dried at 140° C. ground to pass 30 mesh, 1% of graphite added and make into pellets.

The pellets were heated in a stream of air from ambient temperature to 250° C. in 3 hours; from 250° C. to 890° C. at 20°/hour and maintained at 890° C. for 16 hours. The catalyst had the nominal atomic ratio V:Sn:Sb=1:1:4. The catalyst was placed in a reactor maintained at 435 C. and a gaseous mixture of 10% by volume of propylene, 60% by volume of air and 30% by volume of steam was passed over the catalyst at 4 seconds contact time. Of the propylene fed, 12% was converted to acrylic acid, 27% to acrolein and 3.5% to carbon dioxide; 51% was recovered unchanged.

EXAMPLE 9

A tin antimony oxide catalyst was mixed with vanadium oxide as detailed in Example 1 except that the nominal atomic ratio was V:Sn:Sb=1:1:2. The catalyst was washed, dried and pelleted as before. The pellets were heated in a stream of air from ambient temperature to 250° C. in 3 hours; from 250° to 875° C. at 20°/hour, and maintained at 875° C. for 16 hours.

The catalyst was placed in a reactor maintained at 420° C. and a gaseous mixture of 10% by volume of propylene, 60% by volume of air and 30% by volume of steam passed over the catalyst at 4 seconds contact time. Of the propylene fed, 14% was converted to acrylic acid, 35% to acrolein, 4.3% to carbon diovide and 43.5% was recovered unchanged.

EXAMPLE 10

Powdered antimony (244 parts by weight) was added slowly at 90–100° to a stirred suspension of vanadium pentoxide (91 parts by weight) in concentrated (70%) nitric acid (1,400 parts by weight), the mixture heated for 30 minutes, diluted with an equal volume of water and filtered. The filter-cake was washed three times by stirring in water (1,000 parts by weight) for 15 minutes; the first and final washes were at ambient temperature and the second at 100°. The washed cake was slurried with water, ball milled for 3 hours then added to concentrated nitric acid (700 parts by weight) and water (2000 parts by weight). Powdered tin (119 parts by weight) was slowly added at 90° to this mixture, and the precipitate washed three times as described above. The cake was dried at 110°, broken down to pass 30 mesh, mixed with 1% graphite and pelleted. The pellets were heated in a furnace from 200° to 850° in 32 hours, then maintained at 850° for 16 hours.

A feed of 5% propylene, 50% air and 45% steam was passed over this catalyst at 370° and 4 seconds contact time. Of the propylene fed, 26% was converted to acrylic acid, 30% to acrolein, 17% to carbon dioxide and 9% was recovered.

EXAMPLE 11

A catalyst with atomic ratios of V:Sb:Sn:Cu of 1:2:1:0.25 was prepared as follows:

Powdered tin (119 parts by weight) was slowly added to a stirred mixture of concentrated nitric acid (700 parts by weight) and water (1,000 parts by weight) at 90–100° C., then vanadium pentoxide (91 parts by weight) added and the mixture stirred for an hour. Concentrated nitric acid (1,400 parts by weight) was then added, the mixture heated to 100° and anitmony powder (244 parts by weight) added in 40 minutes. The mixture was cooled, filtered and washed three times as described in Example 3 and the washed filter cake stirred into a solution of copper nitrate trihydrate (60 parts by weight) in water (700 parts by weight). Ammonia (d. 0.880, 63 parts by weight) was added and the suspension filtered, and washed twice by stirring in water (1,000 parts by weight). The filter cake was dried pelleted and heat treated as described in Example 3 and a feed of 5% propylene, 50% air and 45% steam was passed over the catalyst at 355° C. and 4 seconds contact time. Of the propylene fed, 20% was converted to acrylic acid and 35% to acrolein.

EXAMPLE 12

A catalyst with a V:Sb:Sn:Fe atomic composition of 1:2:1:0.5 was prepared in the manner described in Example 11, but with the substitution of ferric nitrate (200 parts by weight) was added in place of copper nitrate.

From a feed of 10% propylene, 70% air and 20% steam, passed over the catalyst at 315° and 4 seconds contact time, the yields (based on propylene fed) were: acrylic acid 16%, acrolein 39%, carbon oxides 9% and recovered propylene, 31%.

EXAMPLE 13

Vanadyl chloride dihydrate (45 parts by weight) was added to a stirred solution of antimony pentachloride (200 parts by weight) in concentrated hydrochloric acid (300 parts by weight), the mixture diluted with water (250 parts by weight) and neutralized to pH 6 by the addition of a solution of ammonia (d. 0.880, ca. 300 parts by weight) in water (300 parts by weight) at a temperature not exceeding 70° C. The precipitate was filtered, washed three times with water (1000 parts by weight), dried at 100° for 16 hours then mixed with 2% graphite and pelleted. The pellets were heated in a stream of air from 250° to 800°, the temperature being increased at the rate of 21° per hour, then maintained at 800° for 16 hours.

A gaseous feed of 5% propylene, 50% air and 45% steam, passed over this catalyst at 425° C. and 4 seconds contact time (calculated at N.T.P.) gave the following yields; acrylic acid 24% acrolein 29% and carbon oxides 10%. The efficiency of conversion of propylene to acrylic acid and acrolein was 68%.

EXAMPLE 14

A feed of 10% propylene, 50% air and 40% steam, passed over an identical catalyst to that of Example 13 at 400° and 4 seconds contact time yielded 26% acrolein, 14% acrylic acid and 4% carbon oxides, based on propylene fed. The efficiency of conversion to acrylic acid and acrolein was 79.5%.

EXAMPLE 15

Chromium chloride hexahydrate ($CrCl_3 \cdot 6H_2O$, 133 parts by weight) was dissolved in water (500 parts) and antimony trioxide (Timonox—registered trademark, 219 parts) added. The mixture was vigorously stirred, and sufficient 880 ammonium hydroxide solution added, at 20° C., dropwise to precipitate chromium hydroxide, and such that the liquid had a pH of 8, and then filtered. Vanadium pentoxide (18.2 parts) was stirred with water (100 parts) at 50° C. and dissolved by the addition of oxalic acid. The mixed antimony-chromium oxides were added to the vanadium oxalate solution and the whole evaporated to dryness. After drying the residue for 12 hours at 120° C. it was formed into ⅛ in. diameter tablets which were heated in an air stream initially at 100° C. The temperature was then raised to 900° C. at 22°/ hour. and maintained at 900° C. for 16 hours.

A mixture of propylene (2447 parts by volume) air (14240 parts) and steam (7180 parts) were passed over the catalyst at a temperature of 411° C. with contact time of 4.4 seconds. The yield of acrolein was 17%, of acrylic acid was 12% and of carbon dioxide was 11% based on the propylene fed. The efficiency of conversion of propylene to acrylic acid was 26%.

I claim:
1. A process for the production of acrylic acid which comprises oxidizing a substance selected from the group consisting of acrolein and propylene was molecular oxygen at an elevated temperature in the vapour phase in the presence of a catalyst consisting essentially of an oxide composition containing antimony and vanadium wherein the atomic ratio of antimony to vanadium is from 1.8:1 to 4:1 which has been heated before use to a temperature in the range of from above 700° C. to about 900° C. in a molecular oxygen containing gas and recovering acrylic acid.

2. A process as claimed in claim 1 wherein the atomic ratio is between 2.5:1 and 3.5:1.

3. A process as claimed in claim 1 wherein the reaction is carried out in the presence of an inert gaseous diluent selected from the group consisting of nitrogen, propane, butane, isobutane, carbon dioxide and mixtures of steam and nitrogen.

4. A process as claimed in claim 3 wherein the diluent contains steam in proportion between 10 and 60% by volume.

5. A process as claimed in claim 1 carried out at a reaction temperature between 250 and 500° C.

6. A process as claimed in claim 1 carried out under pressures of from 0.5 to 5 atmospheres absolute.

7. A process for the production of acrylic acid which comprises oxidizing a substance selected from the group consisting of acrolein and propylene with molecular oxygen at an elevated temperature in the vapor phase in the presence of a catalyst consisting essentially of an oxide composition containing antimony and vanadium and at least one of a polyvalent metal selected from the group consisting of chromium, manganese, iron, cobalt, nickel, tin, copper, zinc, cadmium, tungsten and thorium, wherein the atomic ratio of antimony to vanadium is within the range of 1.8:1 to 4:1 and the atomic ratio of vanadium to each polyvalent metal is within the range of 1:0.25 to 1:2, said composition being heated before use to a temperature in the range of from above 700° C. to about 900° C. in a molecular oxygen containing gas, and recovering acrylic acid.

8. The process of claim 7 wherein the catalyst contains antimony, tin, and vanadium.

9. A process as claimed in claim 7 wherein the oxide composition contains antimony, vanadium, iron and tin.

10. A process as claimed in claim 7 wherein the oxide composition contains antimony, vanadium, copper and tin.

11. A process as claimed in claim 7 wherein the catalyst is heated between 750–850° C.

References Cited

UNITED STATES PATENTS

| | | | |
|---|---|---|---|
| 3,358,020 | 12/1967 | Hendrick | 260—530 |
| 3,409,665 | 11/1968 | Brown et al. | 260—530 |
| 3,408,392 | 10/1968 | Yamagishi et al. | 260—530 |
| 3,419,607 | 12/1968 | Hurst | 260—530 |
| 3,456,002 | 7/1969 | Komuro et al. | 260—530 |

FOREIGN PATENTS

| | | | |
|---|---|---|---|
| 1,285,654 | 1/1962 | France | 260—530 |

CHARLES B. PARKER, Primary Examiner

V. GARNER, Assistant Examiner

U.S. Cl. X.R.

252—456, 461, 467, 471, 472, 475, 476; 260—533, 604

PO-1050
(5/69)

UNITED STATES PATENT OFFICE
CERTIFICATE OF CORRECTION

Patent No. 3,579,574      Dated May 18, 1971

Inventor(s) WILHELMUS TEUNIS VAN DER MEER

It is certified that error appears in the above-identified patent and that said Letters Patent are hereby corrected as shown below:

Col. 1, line 45, "materals" should read --metals--

Col. 4, line 50, "32 mesh" should read --30 mesh--

Col. 5, line 48, "ac acrolein" should read --to acrolein--

Col. 5, line 49, insert "Example 7" as heading.

Col. 6, line 43, "435 C" should read --435°C--

Col. 7, line 25, "anitmony" should read --antimony--

Col. 7, line 58, "(300 parts by weight)" should read --(350 parts by weight)--

Signed and sealed this 21st day of March 1972.

(SEAL)
Attest:

EDWARD M. FLETCHER, JR.
Attesting Officer

ROBERT GOTTSCHALK
Commissioner of Patents